INVENTOR.
CARL BORDENCA

United States Patent Office 3,510,514
Patented May 5, 1970

3,510,514
PROCESS FOR THE MANUFACTURE OF SORBIC ACID
Carl Bordenca, Ponte Vedra Beach, Fla., assignor, by mesne assignments, to SCM Corporation, New York, N.Y., a corporation of New York
Filed June 19, 1967, Ser. No. 646,993
Int. Cl. C07c 57/10
U.S. Cl. 260—526          6 Claims

ABSTRACT OF THE DISCLOSURE

A process for the manufacture of sorbic acid representing a departure from previously known processes for sorbic acid preparation has been discovered and is described. The process comprises hydrolyzing at least one member of a novel class of mono-unsaturated tetrahalogenated hexenes in an aqueous medium until dehydrohalogenation occurs and a sorbate hexadienoate salt is formed in the medium. The medium is then acidified and substantially pure sorbic acid is recovered therefrom.

A novel class of mono-unsaturated, tetrahalogenated hexenes employed as starting materials in the sorbic acid process has also been discovered. Specific compounds falling within the class are described along with their method of preparation.

---

The invention relates to a novel process for the manufacture of sorbic acid. The invention further relates to a novel class of mono-unsaturated tetrahalogenated hexenes which are employed as starting materials in the sorbic acid process.

Sorbic acid is a valuable article of commerce and is used in synthetic drying oils, in the up-grading of natural drying oils, as a growth inhibitor of micro organisms, particularly molds, and as a food preservative. Sorbic acid and certain of its esters and salts have been approved for incorporation in foods by the United States Food and Drug Administration.

The present invention is advantageous in that it concerns a simple, economical process for the manufacture of sorbic acid which is a departure from previously known methods of sorbic acid synthesis. The invention is further advantageous in that it provides a novel class of hereinafter defined mono-unsaturated tetrahalogenated hexenes which are employed as starting materials in the process.

One aspect of the invention is based on the discovery of a process which comprises the steps of (A) hydrolyzing a novel compound of the formula:

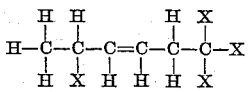

where X represents a halogen atom selected from the group consisting of chlorine and bromine atoms, in an aqueous alkaline medium until a sorbate salt is formed;
(B) acidifying said medium, and
(C) recovering sorbic acid from the medium so acidified.

By so proceeding, the mono-unsaturated tetrahalogenated 3-hexene is simultaneously hydrolyzed, dehydrochlorinated and unexpectedly isomerized to form a sorbate salt (the salt of 2,4-hexadienoic acid). Substantially pure sorbic acid can readily be recovered from the medium by acidification thereof.

Figure 1:
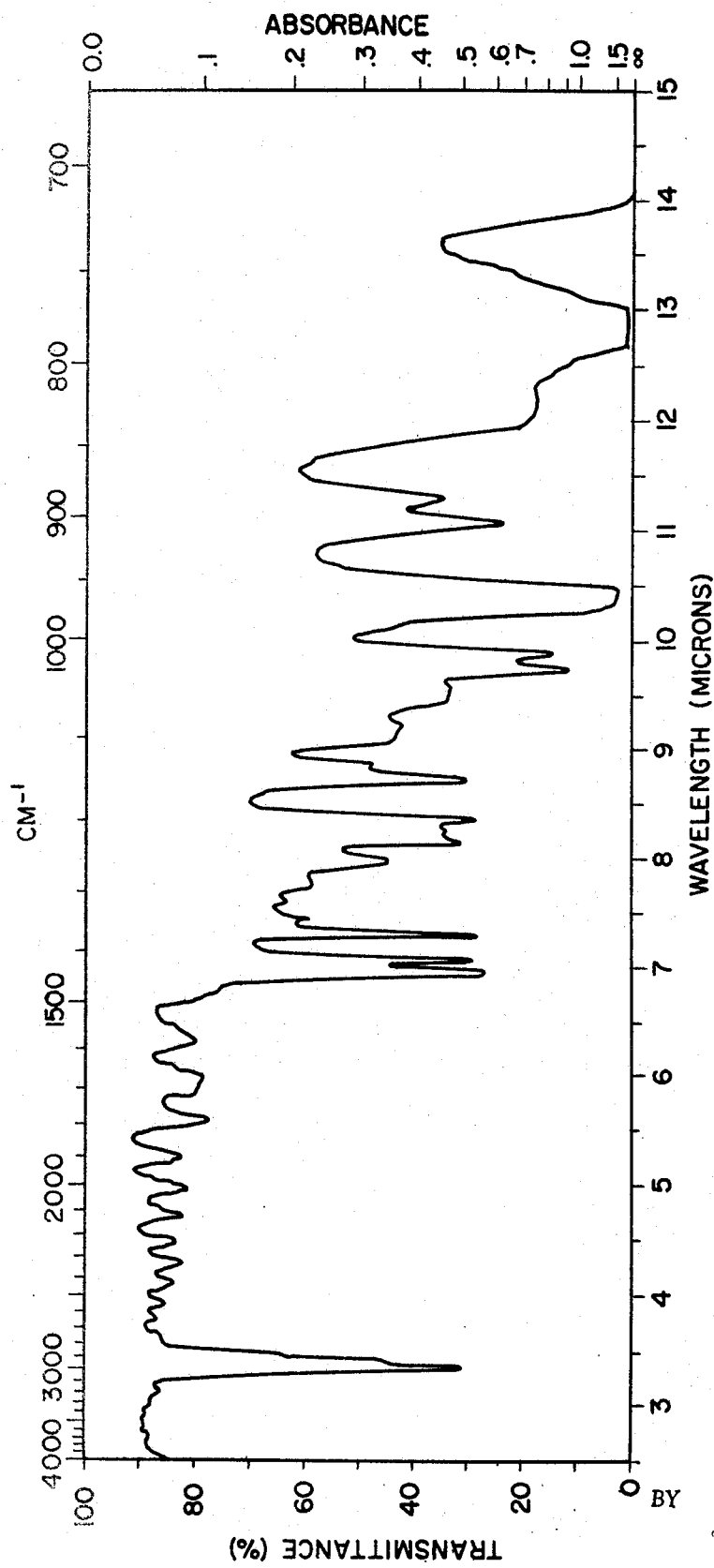
Figure 2:
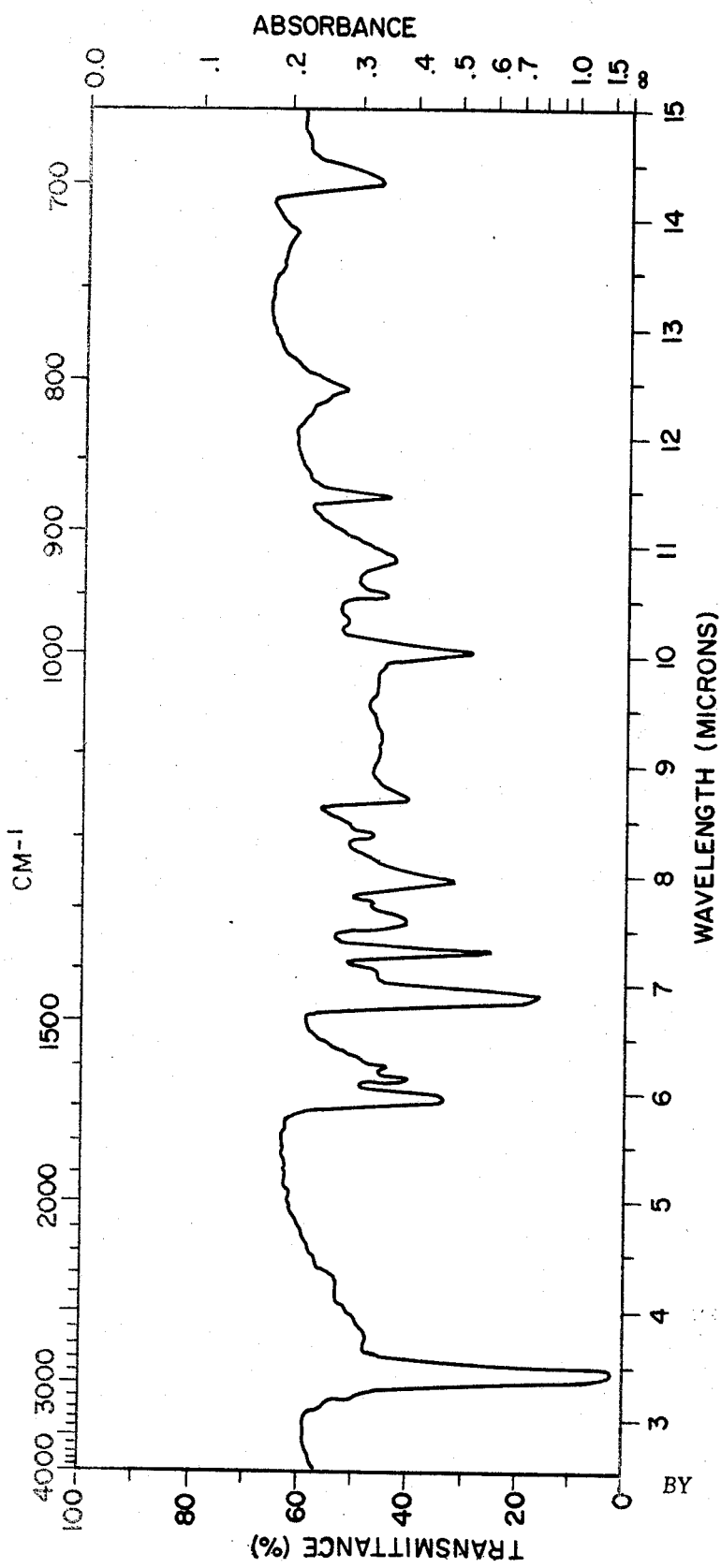

In the attached drawings, FIG. 1 represents the infrared absorption pattern of 1,1,1,5-tetrachloro-3-hexene, one specific preferred mono-unsaturated tetrahalogenated hexene falling within the scope of the novel class of compounds of this invention which is employed in the process for the manufacture of sorbic acid. FIG. 2 represents the infrared absorption pattern of sorbic acid prepared from 1,1,1,5-tetrachloro-3-hexene. The infrared absorption pattern of FIG. 2 is substantially identical with the infrared absorption pattern of commercially available pure sorbic acid obtained from conventional syntheses.

HYDROLYSIS AND ISOMERIZATION OF A MONO-UNSATURATED TETRAHALOGENATED HEXENE

The hydrolysis step of the process of this invention can be carried out by any of a number of conventional hydrolysis procedures but is advantageously accomplished by forming an aqueous alkaline reaction mixture comprising from about 5 to about 25 weight percent of a compound falling within the scope of the formula designated I; from about 5 to about 25 weight percent of a hereinafter defined water soluble, inorganic, alkaline substance and from about 90 to about 50 weight percent of water or a mixture of water and an inert water miscible organic liquid having a boiling point above water. The resultant mixture has a pH above about 10 and usually has a pH above about 13.

Although the hexene compound in the mixture will sometimes undergo hydrolysis at room temperature, it has been found desirable to heat the mixture to a temperature above about 50° C., preferably to a temperature above about 100° C., until a sorbate salt is formed. Elevated temperatures are preferred since shortened reaction times and maximum sorbate salt yields are obtained under these conditions. Although hydrolysis temperatures of 130° C. and higher may sometimes be employed there is usually no advantage and there is some danger of decomposition of the hexene moiety in the hydrolysis mixture. Temperatures between about 105° and 125° C. have been found to be particularly advantageous from the standpoint of process time and product yield.

Hydrolysis is preferably carried out at atmospheric pressure. Although this step can be carried out at superatmospheric pressures, such procedure is economically disadvantageous due to the cost of pressure equipment. It is preferred to carry out hydrolysis at atmospheric pressure under reflux conditions at temperatures within the aforedefined range.

As will be evident to those skilled in the art, hydrolysis times may vary considerably depending upon a number of factors such as temperature, water soluble alkaline material employed, the concentration of starting hexene in the medium, and the like. Usually, complete hydrolysis as evidenced by the substantially complete conversion of the mono-unsaturated hexene to the sorbate salt, will require from between about 30 minutes to about 6 hours. Completion of the hydrolysis and conversion to the sorbate salt can be readily determined by aliquot sampling of the hydrolysis mixture and infrared analysis of the sample.

The starting mono-unsaturated tetrahalogenated hexene employed in the hydrolysis step of the process of this invention may be any one or a mixture of two or more of the following limited class of novel compounds falling within the scope of compound I and provided in one aspect of this invention:

1,1,1,5-tetrachloro-3-hexene (II)
1-bromo, 1,1,5-trichloro-3-hexane (III)
1,1-dibromo-1,5-dichloro-3-hexene (IV)
1,1,1-tribromo, 5-chloro-3-hexene (V)
1,1,1,5-tetrabromo-3-hexene (VI)
1-chloro, 1,1,5-tribromo-3-hexene (VII)
1,1-dichloro, 1,5-dibromo-3-hexene (VIII)
1,1,1-trichloro, 5-bromo-3-hexene (IX)

Any one or a mixture of any or all of the above novel compounds may be suitably incorporated in the aqueous alkaline medium (reaction mixture) employed in the process of this invention. Each of the above compounds have a distinct infrared absorption pattern. An example of the infrared absorption pattern of compound II is exemplified in FIG. 1 hereinbefore referred to.

As will be hereinafter evident from the specific examples, the novel compounds of this invention can be suitably prepared by reacting a carbon tetrahalide (e.g., cartion terachloride, carbon tetrabromide, or mixtures thereof) with piperylene at superatmospheric pressures and elevated temperatures in the presence of a catalyst. The compounds so prepared are identified by conventional analytical methods (e.g., determination of carbon, hydrogen and halogen content, point of unsaturation and infrared absorption spectra).

The amount of tetrahalogenated hexene employed in the alkaline reaction mixture may vary considerably but is preferably in the range of from about 5 to about 25 weight percent, basis the weight of the medium. Although less than about 5 weight percent can be employed, such concentrations are usually disadvantageous because of the low yield of sorbate salt obtained with relation to the reaction mass. On the other hand, although more than about 25 weight percent of the halogenated hexene can be employed, there is usually no advantage and concentrations above 25 weight percent will usually require disadvantageously excessive amounts of water soluable inorganic alkaline material.

A wide variety of water soluble inorganic alkaline materials can be employed in the hydrolysis step of the process of this invention. Examples of such water soluable inorganic alkaline materials include alkali metal hydroxides such as sodium potassium or lithium hydroxides, water soluble alkali metal salts such as alkali metal carbonates, alkali metal acetates and water soluble alkalime earth metal carbonates or acetates or mixtures of these.

The amount of water soluble inorganic alkaline material used may vary considerably depending upon the concentration of halogenated hexene employed, the higher concentrations of inorganic alkaline material corresponding to the higher concentrations of halogenated hexene as well as the dissociation and the alkalinity of water soluble inorganic alkaline material employed. Thus, for example, lower concentrations of water soluble inorganic alkaline material are used when an alkali metal hydroxide is empolyed than when an alkali metal or alkaline earth metal carbonate or acetate is employed.

Generally, from about 5 to about 25 weight percent of water soluble inorganic alkaline material will be sufficient to provide a medium having a pH of 10 or greater during and at the conclusion of the hydrolysis reaction. If less than about 5 percent water soluble inorganic alkaline material is employed, an incomplete reaction may sometimes occur resulting in a mixture of sorbate salt and halogenated hexene. Although more than 25 weight percent of water soluble inorganic alkaline material can sometimes be employed such as, for example, when an alkali metal carbonate is used, lower yields are usually obtained. Preferably the hydrolysis medium will contain an alkali metal hydroxide in a concentration such that at least 5 atoms of metal are available for reaction with the halogen atoms of the halogenated hexene.

As previously noted, the aqueous alkaline mixture can contain from 90 to about 50 weight percent of water. However, it has been found advantageous to employ a mixture of water and an inert water miscible organic liquid having a boiling point above water to provide water miscible mixtures which have a boiling point between about 105° and 125° C. Preferred water miscible organic liquids having the above-described properties are the lower aliphatic polyhydric alcohols including ethylene glycol, propylene glycol, glycerine, butylene glycol, the pinacols, monohydric alcohols including butyl, amyl and cyclohexyl alcohols, and the like. Such water miscible, inert organic liquids can be employed in a wide range of concentrations but are usually used in amounts sufficient to raise the boiling point of the medium to within a temperature between about 105° and 125° C. in order that the aqueous alkaline medium can be heated at reflux temperatures. Under preferred process conditions the water miscible organic liquid can constitute between 10 and 25 percent of the medium and (when employed) replaces a corresponding amount of the water.

By so proceeding, an aqueous alkaline reaction mixture comprising metal halides and sorbate salts, dispersed in the aqueous alkaline medium are obtained. The sorbate salt can be readily converted to sorbic acid by acidifying the medium, usually to a pH below 7, preferably to a pH of below 4, to form sorbic acid and the afore-defined metal salts dispersed in an aqueous acidic medium. Acidification of the aqueous alkaline sorbate salt-containing medium is conventionally accomplished by adding an aqueous acid solution such as an aqueous solution of a mineral acid, for example, sulphuric, hydrochloric or phosphoric acids. During and after acidification sorbic acid is formed and the sorbic acid is recovered by conventional methods such as by cooling and/or concentrating the medium to form a dispersion-containing solid sorbic acid. The sorbic acid which is usually in crystalline form can then be separated by centrifugation, filtration, decantation or the like. The sorbic acid so obtained is substantially pure but, if desirable, it can be further purified by conventional recrystallization procedures.

The following specific examples are intended to illustrate the invention but not to limit the scope thereof, parts and percentages being by weight unless otherwise specified.

Example 1

The preparation of 1,1,1,5-tetrachloro-3-hexene.—To a glass lined laboratory pressure reaction vessel, there was added the following ingredients in the order and in the amounts listed below:

| Ingredient | Amount | |
|---|---|---|
| | Grams | Mols |
| Carbon tetrachloride | 385 | 2.5 |
| Benzoin | 2.65 | 0.015 |
| Piperylene | 85.9 | 1.25 |
| FeCl$_3$·6H$_2$O | 3.35 | 0.125 |
| Diethylamine hydrochloride | 2.05 | 0.02 |
| Methyl cyanide | 102.5 | 2.5 |

The pressure reactor was sealed and the resultant reaction mixture heated to 108° C. after which the pressure reactor was immersed in an ice bath. The temperature of the contents in the vessel continued to rise to 145° C. (the pressure rising correspondingly) due to the exothermic nature of the reaction. Thereafter, the contents of the reaction vessel were cooled to room temperature. Residual pressure was slowly bled from the reaction vessel through a valve and the contents were removed. Fractional distillation of the contents produced 25 grams of a material which was identified as 1,1,1,5-tetrachloro-3-hexene which, upon analysis, was shown to consist of the following constitutents:

Element: Percent
 Carbon _____ 32.5
 Chlorine _____ 64.0
 Hydrogen _____ 3.5

The material was subjected to infrared analysis and gave the absorption spectrum shown in FIG. 1.

The material was set aside for hydrolysis and conversion to sorbic acid as described in Example 4.

Example 2

The procedure of Example 1 was repeated except that the pressure vessel was immersed in a cooling bath comprising ice and salt and the temperature of the contents had reached 100° C. and the cooling was such that the temperature rose only to 115° C. Fractional distillation resulted in the recovery of one gram of this material indicating that an incomplete reaction had occurred. The recovered material had an infrared absorption spectrum substantially identical with the infrared absorption spectrum of the material obtained from Example 1.

Example 3

The procedure of Example 1 was repeated except that 829.2 grams (2.5 mols) of carbon tetrabromide was employed in place of the 2.5 mols of carbon tetrachloride employed in Example 1. The material obtained after fractional distillation had substantially the theoretical elemental content corresponding to the formula $C_6H_3Br_4$.

When 2.5 mols of a 50–50 mixture of carbon tetrachloride and carbon tetrabromide are employed in place of the carbon tetrachloride employed in Example 1, the resultant product is a mixture of compounds II through IX hereinbefore described.

Example 4

The preparation of sorbic acid.—A reaction mixture containing the following ingredients in the amounts listed below was formed by charging the various ingredients to a laboratory reaction flask equipped with a reflux condenser:

| Ingredient: | Amount (grams) |
|---|---|
| Potassium hydroxide | 50 |
| Water | 150 |
| Ethylene glycol | 50 |
| 1,1,1,5-tetrachloro-3-hexene | 40 |

The resultant reaction mixture which had a pH of 13.5 was heated at reflux (113° C.) for 2 hours after which heating was discontinued, the reaction mixture cooled to room temperature and 110 milliliters of 35 percent aqueous hydrochloric acid was added. The mixture was then cooled to about 0° C. during which time crystals formed in the acidified mixture. The crystals were removed by filtration and washed in cold water and recrystallized in a liquid consisting of diethyl ether. The melting point of the crystals obtained by recrystallization was 131–134° C. An infrared absorption spectrum of the crystals (shown in FIG. 2) was identical with the infrared absorption spectrum of a pure commercial sorbic acid manufactured by Matheson Coleman and Bell, Inc.

When 40 grams of propylene glycol are substituted for the 50 grams of ethylene glycol in the above procedure, substantially identical results are obtained.

When ethylene glycol is replaced with an equal weight of water in Example 4, the reflux temperature is 102° C. and the heating time was 2.5 hours.

When the potassium hydroxide is replaced with 75 grams of sodium carbonate in Example 4 and the reflux time increased to 3 hours, substantially identical results are obtained.

Example 5

Equal weight parts of the crystals obtained by the procedure of Example 4 and the commercial crystals referred to in that example were mixed and a melting point determination was made on the mixture. The mixed melting point of the crystals was 131–134° C. demonstrating that the crystals obtained from the hydrolysis consisted substantially of sorbic acid. Elemental analysis of the crystals obtained in Example 4 showed that they consisted of the following elements in the amounts listed below:

| Element: | Percentage |
|---|---|
| Carbon | 64.27 |
| Hydrogen | 7.19 |
| Oxygen | 28.54 |

The elemental analysis was in substantial conformation with the theoretical analysis of pure sorbic acid.

Example 6

The procedure of Example 4 was repeated except that 20 grams of the 1,1,1,5-tetrachloro-3-hexene employed in that example was replaced with 25 grams of 1,1,1,5-tetrabromo-3-hexene. A sorbic acid product substantially identical to the sorbic acid of Example 4 was obtained.

When a reaction product obtained by reacting piperylene with a mixture of $CCl_4$ and $CBr_4$ and comprising a mixture of monounsaturated tetrahalogenated hexene is employed, a pure sorbic acid product is also obtained.

When the reaction mixture was concentrated to one-half its volume, after the addition of acid and prior to cooling, a substantially identical sorbic acid product is obtained.

In the preparation of 1,1,1,5-tetrahalo-3-hexene (exemplified in Example 1) benzoin, ferric chloride hydrate, diethylamine hydrochloride and methyl cyanide function as a mixed catalyst and affect the conversion of piperylene, a pentadiene (also referred to as delta-1,3-amenylene) to the tetra halogenated hexene.

What is claimed is:

1. A process for the manufacture of sorbic acid which comprises the steps of:
 (A) hydrolyzing a compound of the formula

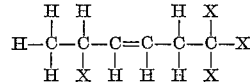

where X represents a halogen atom selected from the group consisting of chlorine and bromine atoms, in an aqueous alkaline medium until a sorbate salt is formed in said medium;
 (B) acidifying said medium, and
 (C) recovering sorbic acid from the medium so acidified.

2. The process of claim 1 wherein said compound is hydrolyzed by forming an aqueous alkaline reaction mixture comprising from about 5 to about 25 weight percent of said compound, from about 5 to about 25 weight percent of an inorganic alkaline substance and from about 90 to about 50 weight percent of a liquid selected from the group consisting of water and a mixture of water and an inert water miscible organic liquid having a boiling point above water, and heating said reaction mixture at a temperature between about 105° and 125° C.

3. The process of claim 1 wherein said medium is acidified to a pH of below about 6.

4. The process of claim 2 wherein the aqueous alkaline medium contains water and from about 10 to about 30 weight percent of a water miscible organic liquid having a boiling point above that of water.

5. The process of claim 4 wherein the hydrolysis is carried out under reflux conditions.

6. The process of claim 5 wherein said compound is 1,1,1,5-tetrachloro-3-hexene and the water miscible organic liquid is a lower alkylene glycol containing from 2 to 6 carbon atoms.

References Cited

UNITED STATES PATENTS 2,398,430  4/1946  Joyce _____ 260—539

JAMES A. PATTEN, Primary Examiner

U.S. Cl. X.R.

260—654